Figure 1:
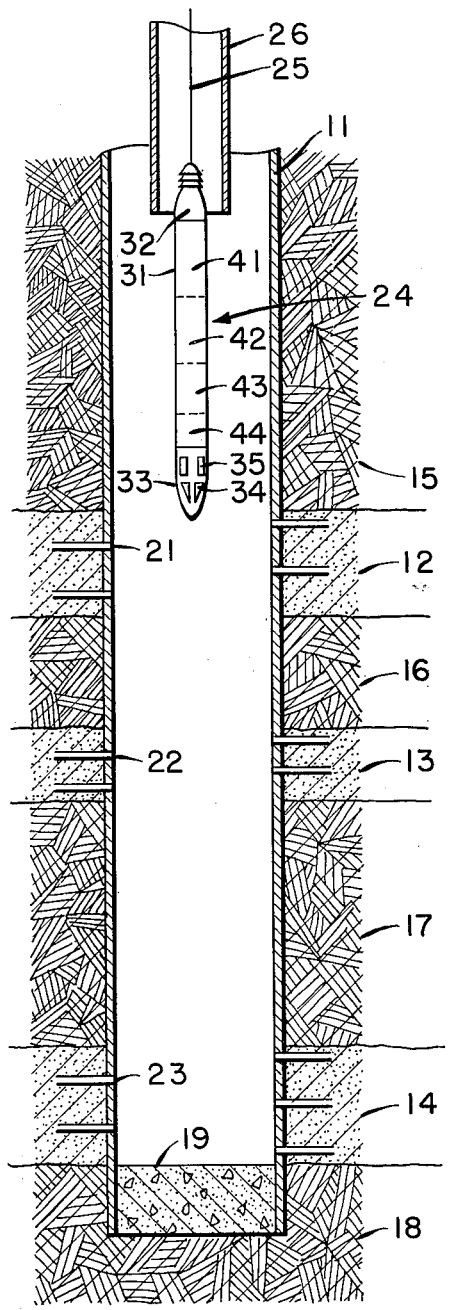

March 11, 1952     J. A. NILES ET AL     2,588,748
APPARATUS FOR MEASURING WELL CHARACTERISTICS
Filed Jan. 22, 1947     3 Sheets-Sheet 1

CHARLES W. ZIEMER
HENRY F. STURGIS
RENIC P. VINCENT
JOSEPH A. NILES
NORRIS B. SIMPSON
*INVENTORS*

BY

*L. Goodwin*
ATTORNEY

March 11, 1952     J. A. NILES ET AL     2,588,748
APPARATUS FOR MEASURING WELL CHARACTERISTICS
Filed Jan. 22, 1947     3 Sheets-Sheet 2

CHARLES W. ZIEMEP
HENRY F. STURGIS
RENIC P. VINCENT
JOSEPH A. NILES
NORRIS B. SIMPSON
*INVENTORS*

BY

*L. Goodwin*
ATTORNEY

Patented Mar. 11, 1952

2,588,748

UNITED STATES PATENT OFFICE 2,588,748

APPARATUS FOR MEASURING WELL CHARACTERISTICS

Joseph A. Niles and Norris B. Simpson, Tulsa, Okla., Henry F. Sturgis, Noroton, Conn., and Renic P. Vincent and Charles W. Ziemer, Tulsa, Okla., assignors to Stanolind Oil and Gas Company, Tulsa, Okla., a corporation of Delaware Application January 22, 1947, Serial No. 723,480

2 Claims. (Cl. 73—204)

This invention relates to means and methods for measuring well characteristics. More particularly, it relates to an instrument which can be lowered into a well on a wire line to record automatically one or more well characteristics.

The invention applies to the type of instrument in which the well characteristic, if not already an electrical quantity, is converted into an electrical quantity such as resistance, current, potential, capacitance, or inductance, and a function of this electrical quantity is then recorded. For example, the rate of flow of fluid in a well can be converted into an electrical quantity by permitting the fluid to flow over a hot wire of high temperature coefficient of resistivity, the rate of flow controlling the temperature of the wire and therefore the resistance of the wire. The resistance of the wire can then be measured by means such as a Wheatstone bridge, a variable impedance in one arm of the bridge being varied to balance the bridge, and the value of the variable impedance at which the bridge is balanced being recorded as a function of the resistance of the hot wire, which is in turn a function of the rate of flow of fluid over the hot wire.

If the well in which the instrument is to be used is a deep high-pressure well, it is important that the instrument be entirely self-contained, so it can be lowered into the well on an inexpensive, uninsulated wire line, since if electrical leads to the surface are employed in such a well a relatively expensive, insulated, armored, multiconductor cable is required with all the dangers of electrical shorts or breaks and cross-feed in the conductors, as well as the difficulty of sealing at the well head around the rough armor of a multiconductor cable.

A convenient means for measuring electrical quantities such as those mentioned above is an electrical circuit such as, for example, a bridge or potentiometer. We have found that these circuits function best, particularly at remote and inaccessible locations, as null-type circuits, a type of circuit in which effects on the circuit of changes in an electrical quantity to be measured are balanced by adjusting a variable impedance in the circuit. In this type circuit the adjustment of the variable impedance required to balance the circuit against the effects of changes in the electrical quantity being measured can be recorded as a function of the electrical quantity.

At the surface of the earth where ample space is available, it is not a difficult task to balance a bridge or potentiometer and record the adjustment required to achieve the balance. Some automatic devices for this purpose have been developed. It is far from a simple matter, however, to provide a means for balancing a bridge, or potentiometer, or similar circuit in the confined and limited space available in a well instrument small enough to be passed through the tubing in wells. It is a further difficult problem to provide, in the limited space available, means for recording the adjustments of a circuit element necessary to bring about balance.

It is, therefore, an object of this invention to provide an improved instrument for logging a well. Another object of this invention is to provide an automatic means for balancing an electrical circuit such as a bridge or potentiometer, said means being of such a nature that it can be included in an instrument to be lowered into a well.

A further object is to provide an automatic means which can be incorporated in a well instrument for recording the adjustment required to balance an electric circuit such as a bridge or potentiometer, as a measure of the effect on the circuit of changes in some well characteristic.

Still another object is to provide an instrument for recording a well characteristic, said instrument employing an electric circuit, a servo mechanism being provided to balance the circuit automatically and simultaneously to provide power for actuating a recording mechanism so the sensitive element need not furnish this power and so decrease its accuracy and sensitivity.

A more specific object is to provide a self-contained flow recorder for use in wells, said recorder including a hot-wire anemometer bridge, means for balancing the bridge, and means for recording as a measure of the rate of fluid flow the adjustment in the circuit required to balance the bridge.

Stated more generally, an object is to provide automatic means for balancing an electric circuit such as a bridge or potentiometer, the balance of which is sensitive to changes in a characteristic to be measured, and recording the circuit adjustment required to keep the circuit in balance as a measure of changes in said characteristic.

Figure 2:
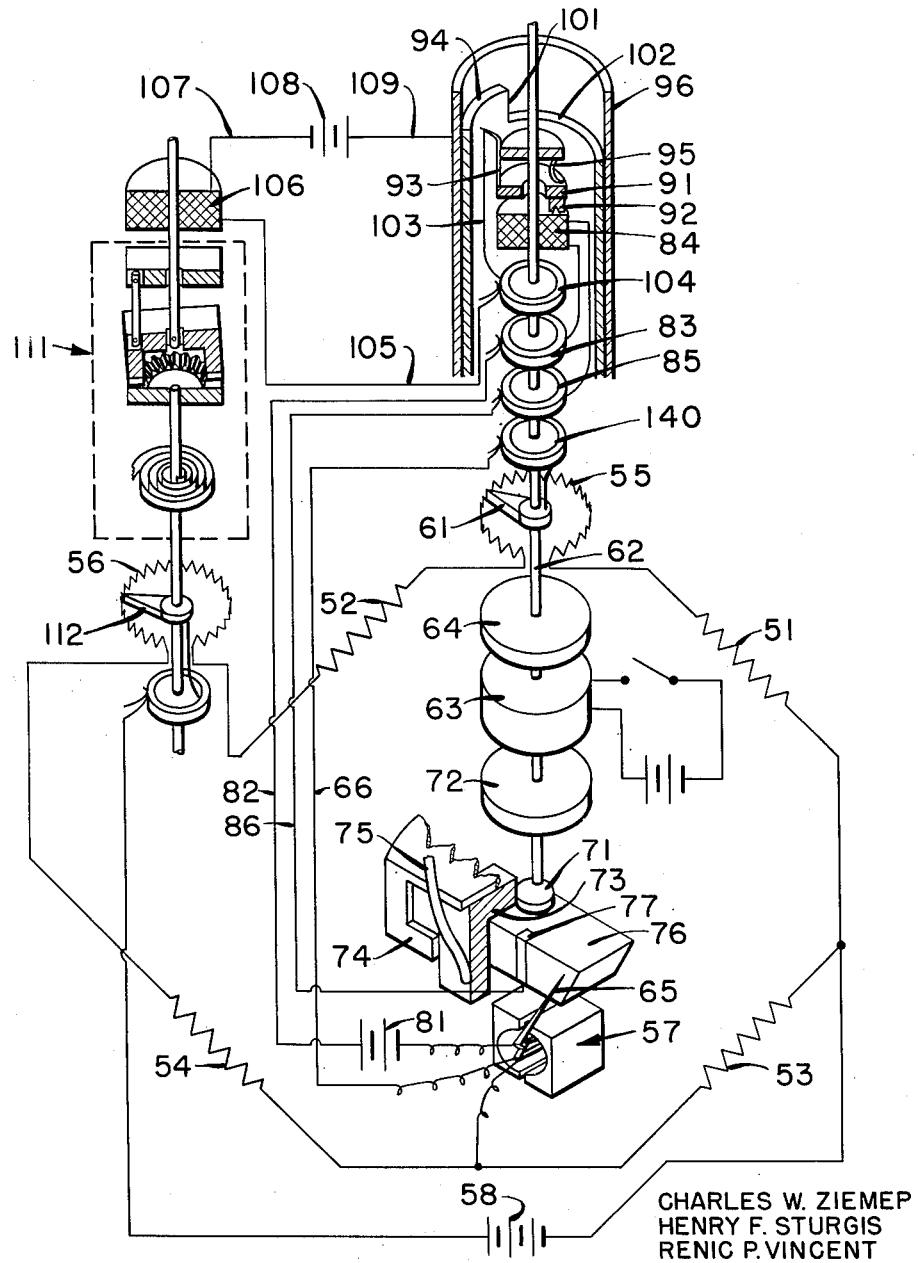
Figure 3:
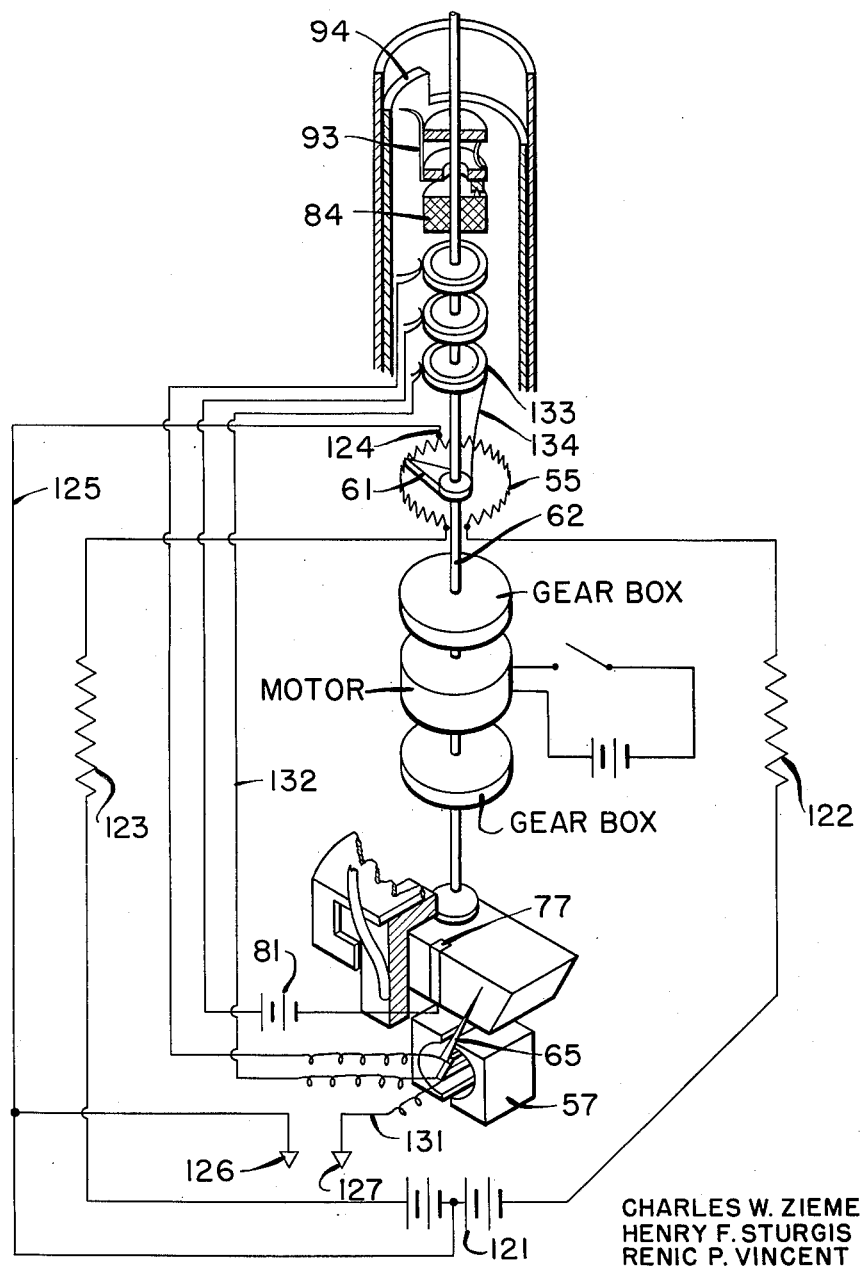

For purposes of illustration, the invention will be described as applied to a hot-wire anemometer bridge for measuring rates of fluid flow in wells. Other application and embodiments and objects of the invention will become apparent when considered in connection with the specification and drawings in which:

Figure 1 is a cross-sectional view of the bottom portion of a well showing an instrument embodying this invention in position to measure fluid flow;

Figure 2 is a wiring diagram and isometric view partly in section of certain essential mechanical parts of an embodiment of the invention as applied to fluid-flow measurements by means of a hot-wire anemometer bridge; and Figure 3 is a combined wiring diagram and isometric view partly in section of certain essential mechanical parts of an embodiment of the invention as applied to a potentiometer for measuring natural or induced potential gradients in a well.

Referring now more specifically to Figure 1, the bottom portion of a well, which may be either an input or output well, is shown. Casing 11 is set in the well through producing formations 12, 13, and 14, and impervious zones 15, 16, and 17, and is set in impervious zone 18. The bottom of casing 11 is closed by cement plug 19. Fluid from producing formations 12, 13, and 14 enters the casing 11 through casing perforations 21, 22, and 23, respectively. If instrument 24, adapted to measure and record fluid flow, is suspended on wire line 25 below the bottom of tubing string 26 but above top producing formation 12, the instrument will record the total flow of fluid from formations 12, 13, and 14. If the instrument is lowered to a position between producing formations 12 and 13, it will record the combined fluid flow from producing formations 13 and 14 only, and, if lowered to a position between producing formations 13 and 14, it will record fluid flow from producing formation 14 only. Obviously, from this information the flow of fluid from each producing formation can be calculated.

The instrument may consist of an outer case 31 connected to top plug 32 and also connected to bottom portion 33 of the instrument. The top plug is attached to the supporting wire line 25 and preferably has a retrieving head. Bottom portion 33 has openings 34 through which fluid enters the bottom portion, and openings 35 through which the fluid leaves the instrument in a producing well. In an input well the direction of flow is, of course, reversed.

Sections 41, 42, 43, and 44 of the instrument are enclosed in outer case 31 and connected electrically and mechanically by pin-and-socket connections. These sections contain the various parts of the instrument shown in detail in Figure 2.

In Figure 2 fixed resistors 51, 52, 53, and 54 and variable resistors 55 and 56, together with galvanometer 57 and battery 58, constitute a bridge circuit. If one of the resistors, for example, resistor 51, is made of a material with a high temperature coefficient of resistance such as platinum, and if the resistances of this resistor and of the other resistors are so selected that the electric current passing through resistor 51 is sufficient to heat it to a temperature above the temperature of the surrounding fluids, the circuit becomes a simple form of the well-known hot-wire anemometer bridge.

Circuit constants found to be satisfactory are as follows:

Resistor 51 is made of 0.001-inch platinum wire and has a resistance of 6.06 ohms at 80° F.

Resistor 52 is made of 0.005-inch platinum wire and has a resistance of 5.76 ohms at 80° F.

Resistors 53 and 54 are made of constantan wire, each having a resistance of 25 ohms.

Variable resistance 55 is made of constantan wire, and has a resistance of 0.28 ohms.

Variable resistance 56 is made of constantan wire, and has a resistance of 2.05 ohms.

Battery 81 is a 1.5-volt flashlight cell.

Motor 63, which may be battery- or spring-operated, continuously rotates shaft 62 through speed-reducing gear box 64. Variable contact 61 of resistor 55 is affixed to and turns with shaft 62. Therefore, as shaft 62 continuously rotates, variable contact 61 continuously moves around resistor 55. Movement of variable contact 61 around resistor 55 continuously increases the portion of 55 in series with resistor 52 to the left of variable contact 61. At the same time, the portion of resistor 55 in series with resistor 51 and to the right of variable contact 61 decreases. It is apparent that resistor 55 can better be considered as two separate resistors, one of which continuously increases on each cycle of variable contact 61 as the other continuously decreases. Obviously, one of these resistors could be eliminated. For example, the right end of resistor 55 could be disconnected from resistor 51, the free end of resistor 51 then being connected to variable contact 61. As a practical matter it has been found more advisable to connect resistor 55 into the circuit as shown so the current passing through resistors 51 and 52 need not pass through the contact surface between variable contact 61 and resistor 55. The important requirement is an element in one arm of the bridge, the resistance of this element being variable through a value at which the bridge is balanced. In Figure 2 this bridge element can be either the portion of resistor 55 to the left of variable contact 61 or the portion to the right of this variable contact. Actually, the two elements work together to produce the desired result in the embodiment shown in Figure 2.

A recorder and associated apparatus for actuating the recorder are also shown in Figure 2. Motor 63 continuously rotates cam 71 at a relatively high speed compared to the speed of shaft 62. A speed-reducing gear box 72 may be used, but in some cases it is desirable to rotate cam 71 at the speed of motor 63. As cam 71 rotates, follower 73 is caused to reciprocate in guide 74 against the action of spring 75. Once each cycle of cam 71 follower 73 presses needle 65 of galvanometer 57 against block 76, which is made of an electrical insulating material such as Bakelite. As variable contact 61 moves around resistor 55, needle 65 of galvanometer 57 moves across the face of block 76. There will be a certain point on block 76 against which needle 65 will be pressed when the bridge is balanced. An insert 77 of electrically conductive material such as platinum is placed in block 76 at this position of balance.

In operation, as variable contact 61 moves around resistor 55, needle 65 moves across block 76, being periodically pressed against block 76 by reciprocating follower 73. When variable contact 61 reaches the position at which the bridge is balanced, follower 73 presses needle 65 against insert 77, completing an electrical circuit including needle 65, battery 81, electrical lead 82, slip ring 83, electromagnet 84, slip ring 85, electrical lead 86, and insert 77. Completion of this circuit thus energizes electromagnet 84.

Electromagnet 84 attracts iron plate 91, causing it to tilt on pivot 92 against the action of spring 95. Tilting of plate 91 causes stylus 93 to make a mark on record chart 94. Electromagnet 84 and stylus 93 are mounted on the same shaft 62 as variable contact 61, so stylus 93 and variable contact 61 rotate together. Since stylus 93 marks record chart 94 only when the bridge is balanced, and since stylus 93 and variable contact 61 rotate together, the marks on chart 94 form a record of the positions on successive revolutions of variable contact 61 at which the bridge was balanced. Thus, the adjustment of a variable impedance required to balance the bridge is recorded as a measure of the effect on the bridge of changes in the rate of flow of fluids. It will also be noted that no energy is supplied by the sensitive element of the bridge for balancing the bridge or actuating the recorder stylus.

Record chart 94 is mounted in record case 96, which is moved in a direction parallel to and may be driven by shaft 62 as this shaft rotates, so that upon each revolution of shaft 62 the record chart 94 is moved slightly in a direction parallel to shaft 62. An example of a satisfactory mechanism for this purpose is shown in U. S. 1,837,222, Kannenstine. The movement of chart case 96 results in marks of stylus 93 on successive revolutions of shaft 62 being substantially uniformly spaced along the chart.

In order to permit the instrument to record as wide a range of flows as possible, it is preferred that the instrument record zero flow at a point near one edge of the record chart 94. It is easy to pre-set variable contact 112 of variable resistor 56 before the instrument is sealed, so the bridge will record zero flow near one edge of the chart at conditions prevailing at the surface of the earth. However, conditions at the surface of the earth and at the bottom of wells ordinarily differ widely. Therefore, without the automatic zero-adjusting device hereinafter described it is sometimes difficult to pre-set variable contact 112 of variable resistor 56 at the surface of the earth so the instrument will record zero flow near the proper edge of the record chart when the instrument is at the bottom of a well. The problem is partially solved by temperature-compensating the bridge, but the adjustment is greatly simplified by the automatically acting mechanism shown at the left of Figure 2.

In the embodiment of this automatic zero-adjusting device shown in Figure 2, record chart 94 is notched at the top, providing an edge 101 at the desired zero-flow position on the chart. Chart case 96 is made of electrically conductive material, and chart 94 is of electrically non-conductive paper. When the stylus strikes in the area where the chart has been notched, i. e., above edge 102 and to the right of edge 101, the stylus strikes the electrically conductive chart case 96, completing a circuit from stylus 93 through electrical lead 103, slip ring 104, lead 105, electromagnet 106, lead 107, battery 108, lead 109, and chart case 96. When this circuit is completed, electromagnet 106 actuates escapement mechanism 111, shown within the dotted lines, moving variable contact 112 of resistor 56 in a direction to cause the bridge to balance when stylus 93 is adjacent edge 101. This action continues until the stylus strikes to the left of edge 101 where the paper of chart 94 acts as insulation between stylus 93 and chart case 96, preventing completion of the circuit including electromagnet 106. Therefore, when the stylus strikes to the left of edge 101, electromagnet 106 is not actuated and contact 112 is not moved. The stylus therefore strikes the chart on succeeding revolutions of the stylus at points along edge 101. The utility of this automatic zero-adjusting device can be better appreciated from the following description of the use of the instrument.

In operation the chart case 96 is placed on shaft 62 in such a position longitudinally that sufficient time is allowed to lower the instrument to the bottom of the well before the stylus 93 strikes below edge 102. The motor 63 is then started, and the instrument is lowered to the position shown in Figure 1. The well is then shut in so there is no flow past the instrument. Variable contact 112 then proceeds to move automatically, as above described, until stylus 93 marks just to the left of edge 101 of the notched portion of the record chart. That is, the instrument is caused to indicate zero flow at bottom-hole conditions when the well is not flowing. As soon as sufficient time has been allowed for chart case 96 to move upward so that stylus 93 is striking the chart 94 below the level of edge 102, the well is allowed to flow at a series of preselected, measured rates, or, in the case of an input well, fluid is injected at a series of preselected, measured rates in order to calibrate the instrument for various rates of flow at bottom-hole conditions. The well is then allowed to flow at a constant rate while the instrument is lowered slowly and continuously to the bottom of the well, or is lowered rapidly to a series of levels, at each of which levels time is allowed for a flow-rate record to be made. When the instrument is withdrawn from the well and the record chart is removed from the instrument, all the necessary data is present on the chart for calculating actual flow from or into the various zones of the well.

Even when the described zeroing mechanism is employed, it has been found advisable to temperature-compensate the bridge. Although many means have been proposed for temperature-compensating hot-wire anemometer bridges, we prefer to use a modification of the means shown in U. S. Patent 2,389,615, Eder, in which a large wire of the same material as the flow-sensitive wire, or a material of similar temperature coefficient of resistivity, is included as one arm of the bridge, the two wires having approximately the same resistance at operating conditions. In Figure 2 the temperature-compensating resistor would preferably be resistor 52. The theory is that a change in well-fluid temperature will affect the resistance of both wires equally, the effects canceling each other in the bridge, leaving the bridge insensitive to temperature change. Actually, it has been found that the effects do not exactly cancel if the resistances of the two wires are equal. We have now discovered that for best temperature compensation the large-diameter wire should have a resistance smaller than the small-diameter wire, the ratio of resistance of the small wire to the large wire lying in the range between about 1.00 and 1.20, the resistances of both wires being measured at the same temperature. When the bridge is used in high-pressure condensate wells, the ratio should be near 1.00. When the bridge is used to measure flow of gas at or near atmospheric pressure, the ratio should be near 1.20.

If resistor 51 is not heated to a temperature above well-fluid temperature but is allowed to follow well temperature, a temperature log of the well can be made. In this case a temperature-insensitive element will be substituted for the temperature-compensating element. The instrument can be used unmodified for detecting gas-liquid interfaces, since heat loss from resistor 51 will be greater in liquid than in gas.

If for resistor 51 is substituted a resistor, the resistance of which is made a function of pressure as shown in U. S. 576,208, Lozier or of fluid density as shown in U. S. 2,235,064, Cloud, the instrument will record these well characteristics.

An embodiment of the invention is shown in Figure 3 applied to the automatic balancing of a potentiometer and the recording of the adjustment of a circuit element necessary to bring about this balance. This embodiment can be used in automatically measuring and recording in a well instrument the natural or induced electrical potential gradient of formations in a well. Battery 121 establishes potential drops across resistors 122, 55, and 123. Resistor 55 has a center tap 124 to which electrode 126 is connected through electric lead 125. The second electrode, 127, of the pair across which the electrical potential gradient of the formations is impressed, as shown in U. S. 1,913,293, Schlumberger and U. S. 1,819,923, Schlumberger, is connected to variable contact 61 of resistor 55 through lead 131, galvanometer 57, lead 132, slip ring 133, and lead 134. By means of this circuit the potential difference between electrodes 126 and 127 is impressed across the portion of resistor 55 between center tap 124 and variable contact 61. Obviously, if the circuit elements are correctly selected, as shaft 62 rotates as explained in connection with the description of the embodiment shown in Figure 2, at some position of variable contact 61 the potential between electrodes 126 and 127 will be exactly equal and opposite to the potential of battery 121 which is applied between center tap 124 and variable contact 61. At this point galvanometer 57 will indicate zero current flow, and needle 65 will be pressed against insert 77, completing the circuit through battery 81 and electromagnet 84, causing the stylus 93 to record on record chart 94 the position of variable contact 61 at which the potentiometer is balanced.

Electrode 126 is attached to center tap 124 of resistor 55, and to the center of battery 121 so that regardless of whether electrode 126 is positive or negative with respect to electrode 127 the potentiometer will be balanced at some position of variable contact 61.

Resistors 122 and 123 may be omitted if desired, but if a standard battery, such as a zinc-carbon "flashlight" cell, is employed it is sometimes desirable to include resistors 122 and 123 so that most of the battery voltage drop occurs across these resistors, leaving only a very small voltage drop across variable resistor 55. For example, if two 1.5-volt flashlight cells are employed for battery 121, the total voltage will be 3 volts, whereas the total desired voltage drop across resistor 55 is about 200 millivolts in making a differential potential log as described. Therefore, the drop across resistors 122 and 123 should total 2.8 volts. The same effect can be obtained by use of a battery furnishing a lower voltage, but it is usually more desirable to employ more common types of batteries, the voltage across resistor 55 being controlled by proper choice of resistors 122 and 123.

The circuits shown in Figures 2 and 3 differ widely in many respects and are similar in other respects. They are similar in that in both circuits the magnitude of electric current flowing in the galvanometer is sensitive both to changes in a well characteristic and to changes in the value of a variable resistor. The adjustment of the variable resistor at which the bridge is balanced is then recorded as a measure of the well characteristic.

The circuits shown in Figures 2 and 3 are representative of the class of circuits in which an electric meter such as a galvanometer is included, the magnitude of current flowing in this electric meter being affected both by changes in a well characteristic and by changes in the value of a variable impedance in the circuit. In this class of circuits the value of the variable impedance at which a predetermined magnitude of current flows in the electric meter can be recorded as a measure of the well characteristic.

In many instances it will be desirable to indicate or record a value which is a function of the variable impedance, rather than indicating or recording the value of the variable impedance itself. For example, in the embodiments described, the position of variable contact 61 is recorded as a function of the variable resistance of the element between variable contact 61 and the left end of resistor 55. It will be understood, therefore, that use of terms such as recording or indicating the value of a variable impedance are intended to include recording or indicating values which are a function of the value of the variable impedance.

Resistors have been shown in the circuits for purposes of illustration, but capacitances, or inductances, or impedances in general can obviously be substituted for the resistors without departing from the spirit of the invention.

It may be convenient at times to make a record of the position of variable contact 61 at which a current other than zero flows through the galvanometer. This is simply accomplished by changing the position of insert 77 in block 76.

Referring to Figure 1 again, section 41 of the instrument generally contains the recording mechanism, motor 63 with gear boxes 64 and 72, galvanometer 57, and resistor 55. Section 42 contains the automatic zeroing device shown in Figure 2. Section 43 contains batteries, and section 44 contains resistors other than 51 and 52, the latter resistors being exposed to the well fluids in section 33.

In order to obtain satisfactory operation from the batteries, it was found necessary to chip out the sealing material in the tops of the batteries to permit escape of gas at well temperatures. In the early use of the instrument when the sealing material was not removed from the batteries, it was found that the batteries always swelled, becoming stuck in the battery section 43 of the instrument. Often the batteries would burst, permitting the corrosive materials to fall into the instrument. Removing the sealing material from the top of the batteries prevented swelling and bursting of the batteries, but permitted escape of corrosive vapors into the instrument. This difficulty was avoided by sealing the battery section 43 of the instrument, sufficient space being provided that a pressure build-up of only about 25 p. s. i. gage occurred in the battery section during a well-logging operation.

Although in the drawing and specification specific embodiments and applications of the invention have been shown and described, it will be apparent that many alterations and modifications

We claim:

1. A self-contained well instrument for measuring a well characteristic comprising in combination an electric circuit including a means for sensing changes in a well characteristic, an electric meter and an element of variable impedance, the magnitude of electric current in said meter varying with changes in said well characteristic and with changes in the impedance of said element of variable impedance, means for varying the impedance of said element of variable impedance, an indicating needle on said meter, an electrode adjacent the path of said indicating needle, the position of said electrode being opposite the position of said indicating needle at which a preselected current flows in said meter, continuously reciprocating means opposite said electrode to press said indicating needle against said electrode, recording means for recording the value of said element of variable impedance at which a preselected current flows in said meter, as a measure of said well characteristic, means actuated by the contact of said electrode and said indicating needle for controlling said recording means.

2. Apparatus for measuring a well characteristic comprising in combination an electric circuit including a means for sensing changes in a well characteristic, an electric meter and an element of variable impedance, the magnitude of electric current in said meter varying with changes in said well characteristic and with changes in the impedance of said element of variable impedance, means for varying the impedance of said element of variable impedance, an indicating needle on said meter, an electrode adjacent the path of said indicating needle, the position of said electrode being opposite the position of said indicating needle at which a preselected current flows in said meter, continuously reciprocating means opposite said electrode to press said indicating needle against said electrode, and means actuated by the contact of said electrode and said indicating needle for indicating the value of said element of variable impedance at which said preselected current flows in said meter, as a measure of said well characteristic.

JOSEPH A. NILES.
NORRIS B. SIMPSON.
HENRY F. STURGIS.
RENIC P. VINCENT.
CHARLES W. ZIEMER.

REFERENCES CITED

The following references are of record in the file of this patent:

UNITED STATES PATENTS

| Number | Name | Date |
| --- | --- | --- |
| Re. 22,637 | Keinath | Apr. 24, 1945 |
| 1,053,086 | Cole | Feb. 11, 1913 |
| 2,277,898 | Andrew | Mar. 31, 1942 |
| 2,348,192 | Chambers | May 9, 1944 |
| 2,389,615 | Eder | Nov. 27, 1945 |